United States Patent
McGrail et al.

(10) Patent No.: US 12,103,866 B2
(45) Date of Patent: Oct. 1, 2024

(54) SYSTEMS, METHODS, AND COMPOSITIONS FOR PURIFYING WATER

(71) Applicant: Battelle Memorial Institute, Richland, WA (US)

(72) Inventors: Bernard P. McGrail, Pasco, WA (US); Jeromy W. J. Jenks, Hines, OR (US); Satish K. Nune, Richland, WA (US); Herbert T. Schaef, West Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 588 days.

(21) Appl. No.: 17/322,865

(22) Filed: May 17, 2021

(65) Prior Publication Data

US 2021/0355006 A1     Nov. 18, 2021

Related U.S. Application Data

(60) Provisional application No. 63/026,329, filed on May 18, 2020.

(51) Int. Cl.
*C02F 1/68* (2023.01)
*C02F 1/04* (2023.01)
(Continued)

(52) U.S. Cl.
CPC ............... *C02F 1/265* (2013.01); *C02F 1/04* (2013.01); *C02F 1/22* (2013.01); *C02F 1/683* (2013.01);
(Continued)

(58) Field of Classification Search
None
See application file for complete search history.

(56) References Cited

U.S. PATENT DOCUMENTS 6,158,239 A * 12/2000 Max .................. C02F 1/265
62/532
6,830,682 B2   12/2004 Max
(Continued)

FOREIGN PATENT DOCUMENTS

CN    203866061       10/2014
CN    108439505 A *   8/2018 ............... C02F 1/00
(Continued)

OTHER PUBLICATIONS

Machine translation of CN-108439505-A, 2018, pp. 1-7. (Year: 2018).*
(Continued)

*Primary Examiner* — Clare M Perrin
(74) *Attorney, Agent, or Firm* — Wells St. John P.S.

(57) ABSTRACT

Systems for removing one or more contaminants from water are provided that can include a hydrate formation chamber assembly; a contaminated water diffusion assembly within the hydrate formation chamber assembly; a space between a wall of the hydrate formation chamber assembly and the diffusion assembly; and a guest compound conduit configured to provide a guest compound within the space and form a hydrate comprising water and the guest compound. Methods for removing one or more contaminants from water are provided that can include providing a contaminated water mixture and one or more guest compounds; forming a hydrate complex comprising water and the one or more guest compounds; and separating the water from the guest compounds to provide water with less contaminant. Mixtures are also provided that can include a liquid component comprising water and at least one contaminant, and a solid component comprising a hydrate complex. One embodiment of the system provides methods for production of excess electric power as a byproduct of the desalination process.

12 Claims, 3 Drawing Sheets

(51) Int. Cl.
*C02F 1/22* (2023.01)
*C02F 1/26* (2023.01)
*B01D 11/04* (2006.01)
*C02F 1/00* (2023.01)
*C02F 9/00* (2023.01)
*C02F 103/08* (2006.01)

(52) U.S. Cl.
CPC .............. *B01D 11/04* (2013.01); *C02F 1/00* (2013.01); *C02F 9/00* (2013.01); *C02F 2103/08* (2013.01); *Y02A 20/124* (2018.01)

(56) References Cited

U.S. PATENT DOCUMENTS

| | | | |
|---|---|---|---|
| 7,560,028 | B1 | 7/2009 | Simmons et al. |
| 9,091,156 | B2 | 7/2015 | Schaef et al. |
| 9,993,826 | B2* | 6/2018 | Lee .......................... B01L 7/54 |
| 10,240,486 | B2 | 3/2019 | McGrail et al. |
| 10,947,114 | B2* | 3/2021 | Hartman ................. C01B 3/001 |
| 2014/0223958 | A1* | 8/2014 | McCormack ............. C02F 1/22 62/123 |
| 2015/0008367 | A1* | 1/2015 | Hartman ............... F17C 11/005 252/188.25 |

FOREIGN PATENT DOCUMENTS

| | | |
|---|---|---|
| CN | 106830136 | 12/2019 |
| EP | 21807504 | 9/2023 |
| KR | 10-2009-0122811 | 12/2009 |
| WO | WO PCT/US2021/032833 | 9/2021 |

OTHER PUBLICATIONS

Feng et al., "Passive Valves Based on Hydrophobic Microfluidics", Sensors and Actuators A: Physical, vol. 108, Nov. 2003, Netherlands, pp. 138-143.

McGrail et al., "A Non-Condensing Thermal Compression Power Generation System", Energy Procedia 129, Sep. 2017, Italy, pp. 1041-1046.

Palodkar et al., "Formulating Formation Mechanism of Natural Gas Hydrates", Scientific Reports 7(1):6392, Jul. 2017, United Kingdom, 11 pages.

Rao et al., "vol. 1: Survey of Available Information in Support of the Energy-Water Bandwidth Study of Desalination Systems", LBNL-1006424, Lawrence Berkeley National Laboratory, Berkeley, California, Oct. 2016, 159 pages.

* cited by examiner

SYSTEMS, METHODS, AND COMPOSITIONS FOR PURIFYING WATER

CROSS REFERENCE TO RELATED APPLICATION

This application claims priority to and the benefit of U.S. Provisional Patent Application Ser. No. 63/026,329 filed May 18, 2020, entitled "Microfluidic Desalination Using Gas Hydrates", the entirety of which is incorporated by reference herein.

STATEMENT AS TO RIGHTS TO DISCLOSURES MADE UNDER FEDERALLY-SPONSORED RESEARCH AND DEVELOPMENT

This disclosure was made with Government support under Contract DE-AC05-76RL01830 awarded by the U.S. Department of Energy. The Government has certain rights in the invention.

TECHNICAL FIELD

The present disclosure generally relates to water purification systems, methods, and/or compositions, as in more particular aspects, to desalination techniques for water.

BACKGROUND

Desalination is an important solution to increase water supplies for municipal water and agriculture, and is considered by some to be an essential technology to purify water produced from various industrial processes, as well as from oil and gas exploration. Reverse osmosis (RO) is the commercial reference standard for desalination technology however such a process generally requires cheap and uninterrupted electric power to run the process, membranes that are susceptible to biofouling and requiring regular maintenance that increases operating costs. Furthermore, when working with water obtained from oil and gas well sites, a high salt content is often present and the location of most of the drilling operations take place away from grid infrastructure which can supply the necessary power to drive most reverse osmosis processes.

Thermal desalination methods previously developed at pilot scale include: multiple-effect distillation (MED); multi-stage flash distillation (MSF) membrane distillation (MD); and forward osmosis (FO). Distillation methods all involve evaporation of water to separate dissolved impurities with the following disadvantages: Large heat input required to raise the water temperature to 100° C. (»300 kJ/kg) and heat of vaporization (2260 kJ/kg) induces salt precipitation on heat exchangers that cause corrosion and fouling. FO still requires a membrane so it has similar maintenance and limitations as RO.

Freeze desalination methods have received limited attention. Studies have shown little or no cost advantage relative to other methods. An exception is a freeze desalination using gas hydrates that increases the freezing point temperature of the system substantially thus reducing energy requirements. However, a practical desalination system using gas hydrates must still overcome the critical challenge of energy required for cooling. Using electric powered chillers would offer no energy advantages over RO. Appropriate refrigerants can be used to keep pressures low. Gas hydrates generated with methane, for example, require high pressures, 1000 psig and higher. A final challenge is an effective system and method to separate the gas hydrate crystals from the residual concentrate brine and refrigerant.

What is needed therefore is an advanced desalination system that operates in such a way to overcome these limitations and is capable of expanding use in desired locations and arrangements. An embodiment for example that enables use of solar thermal or industrial waste heat to provide cooling instead of electric power can potentially produce water at substantially lower cost than reverse osmosis, is deployable at more locations, and can treat even high salinity produced waters, would be a significantly desirable system. This description provides information regarding a new combination of heat to cooling with a microfluidic separations method to conduct "desalination on a chip" which provides a series of significant advances in this space. An ancillary benefit of the systems and/or methods of this disclosure is the ability of the system in one embodiment to produce excess power in addition to potable water.

SUMMARY

Systems for removing one or more contaminants from water are provided. The systems can include a hydrate formation chamber assembly; a contaminated water diffusion assembly within the hydrate formation chamber assembly; a space between a wall of the hydrate formation chamber assembly and the diffusion assembly; and a guest compound conduit configured to provide a guest compound within the space and form a hydrate comprising water and the guest compound.

Methods for removing one or more contaminants from water are also provided. The methods can include providing a contaminated water mixture and one or more guest compounds; forming a hydrate complex comprising water and one or more guest compounds; and separating the water from the guest compounds to provide water with less contaminant.

Mixtures are also provided that can include a liquid component comprising water and at least one contaminant, and a solid component comprising a hydrate complex.

DRAWINGS

Embodiments of the disclosure are described below with reference to the following accompanying drawings.

DESCRIPTION

This disclosure is submitted in furtherance of the constitutional purposes of the U.S. Patent Laws "to promote the progress of science and useful arts" (Article 1, Section 8).

Figure 1:
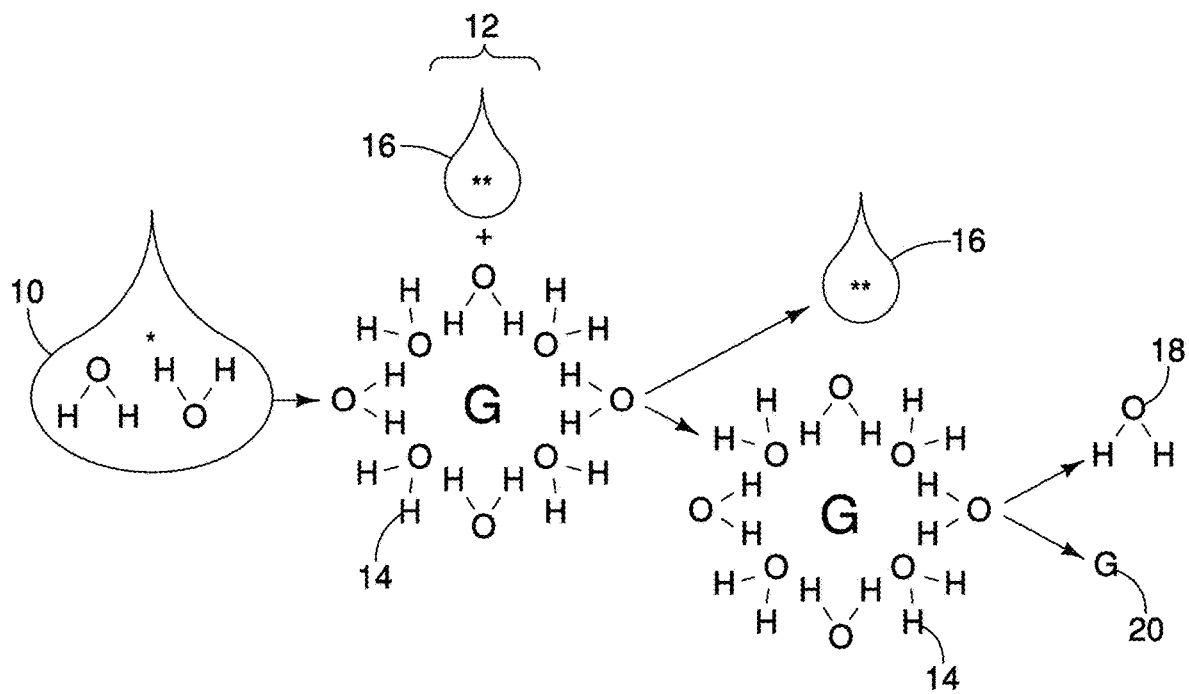
FIG. 1 is a depiction of a method for purifying water according to an embodiment of the disclosure.

The present disclosure will be described with reference to FIGS. 1-7. Referring first to FIG. 1, an example method for purifying water is provided that includes a contaminated water mixture 10 that is then transformed to a mixture 12 that includes a concentrated contaminated water mixture 16 and a hydrate complex 14. The contaminant of the water is represented as an "*", and as shown, the quantity of "*" increases from the original water mixture 10 to the water mixture 16.

In accordance with example implementations, mixture 12 can include a solid hydrate 14 and a liquid concentrated contaminated water mixture 16. Accordingly, the mixture 12 can include both a solid and liquid component. In accordance with example implementations, the solid and liquid components can be separated to form a separate mixture of the concentrated contaminated water 16 and a separate mixture of the hydrate complex 14 and/or guest compound, and then the hydrate complex 14 can be dissociated to form separate streams of the guest compound 20 and purified water 18.

In accordance with example implementations, the contaminated water can include a salt contaminant such as that found in seawater, and/or the contaminated water can include other contaminants that may be found in wastes that include aqueous or water mixtures. These contaminants can be found in wastes generated during oil and gas processing and/or other industrial processes. Therefore, the present disclosure is not limited to simply the desalinization of water but can be used for other water purification technologies as well.

The guest compound present in the hydrate complex 14 can be numerous guest compounds, including hydrocarbons (e.g., methane, ethane, etc.), fluorocarbons (e.g., R134a) which include hydrofluorocarbons, as well as carbon dioxide, $H_2S$ and/or other refrigerants, for example. Additional guest compounds that may be utilized are described in more detail below when referring to specific embodiments of the disclosure.

Figure 2:
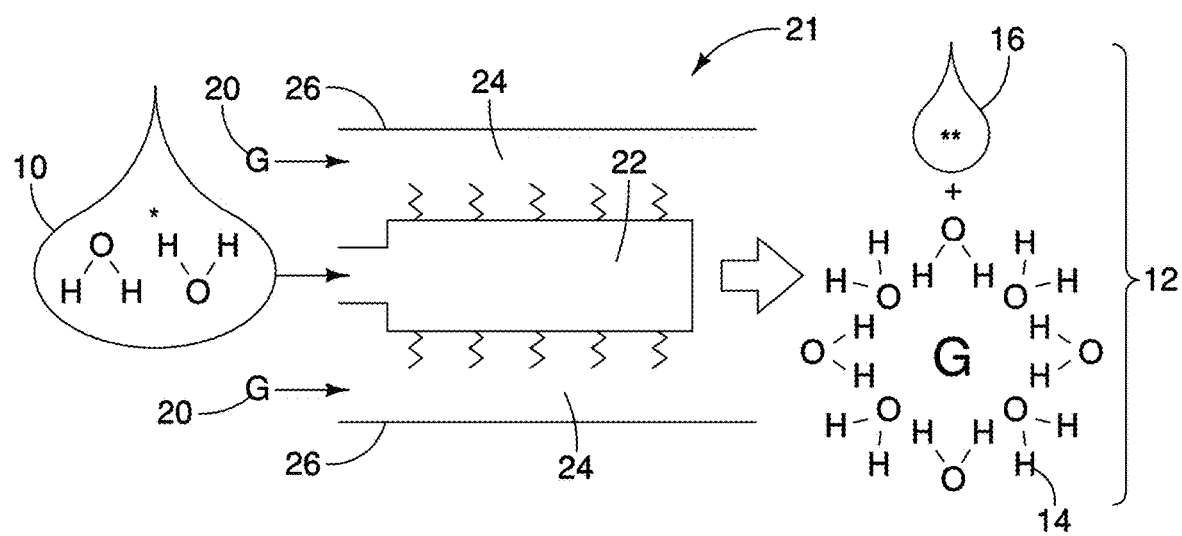
FIG. 2 is a depiction of an assembly used for purifying water according to an embodiment of the disclosure.

Referring next to FIG. 2, an assembly of a system for purifying water is provided. In accordance with example implementations, hydrate formation chamber assembly 21 is provided that can include a contaminated water diffusion assembly 22 within hydrate formation chamber assembly 21. Hydrate formation assembly 21 can include a space 24 between walls 26 of the hydrate formation chamber assembly 21 and the diffusion assembly 22. In accordance with example implementations and with respect to FIG. 2, a single cross section is shown that includes at least two spaces 24. Other configurations are contemplated, than can include a single space configuration that allows for the mixing of guest compounds and contaminated water 10.

In accordance with example implementations, contaminated water is provided to diffusion assembly 22 and the contaminated water is allowed to aerosolize and enter space 24 and combine with guest compounds 20 at specific temperatures to generate a solid hydrate 14 and a concentrated contaminated liquid 16. The details of flow and/or temperatures are provided below with reference to specific embodiments of the disclosure.

Figure 3:
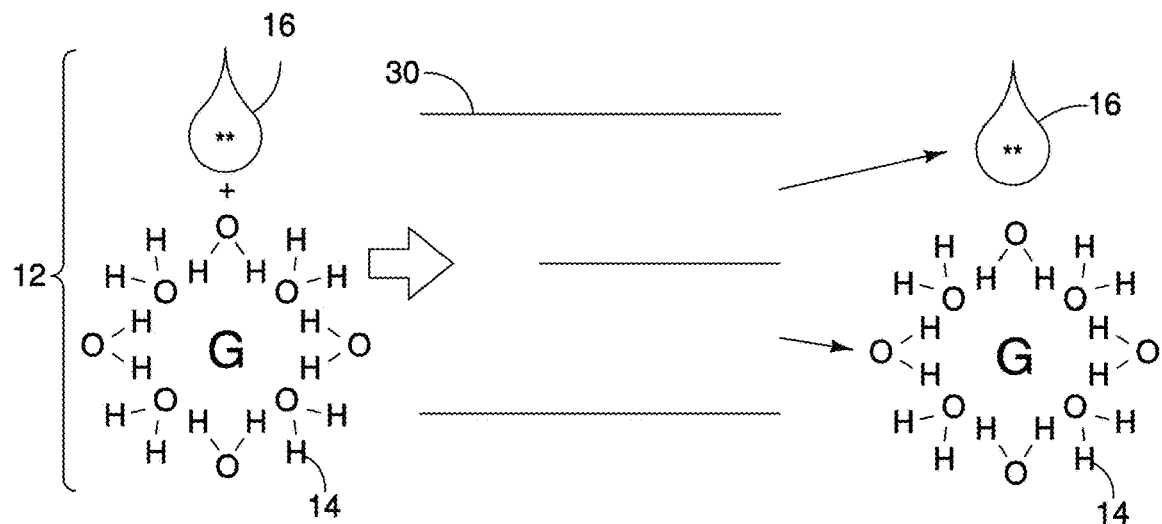
FIG. 3 is a depiction of another assembly used for purifying water according to an embodiment of the disclosure.

Referring next to FIG. 3, the mixture 12 can then be provided to a liquid solid separation assembly 30 that is configured to separate the solid hydrate from the contaminated concentrated liquid to form a stream of separated contaminated concentrated liquid and solid hydrate suspended in guest compound (G). This separation can be performed by associating the hydrophobic hydrate/guest compound mixture with a hydrophobic pathway, and associating the hydrophilic contaminant concentrated liquid with a hydrophilic pathway in the separator.

Figure 4:
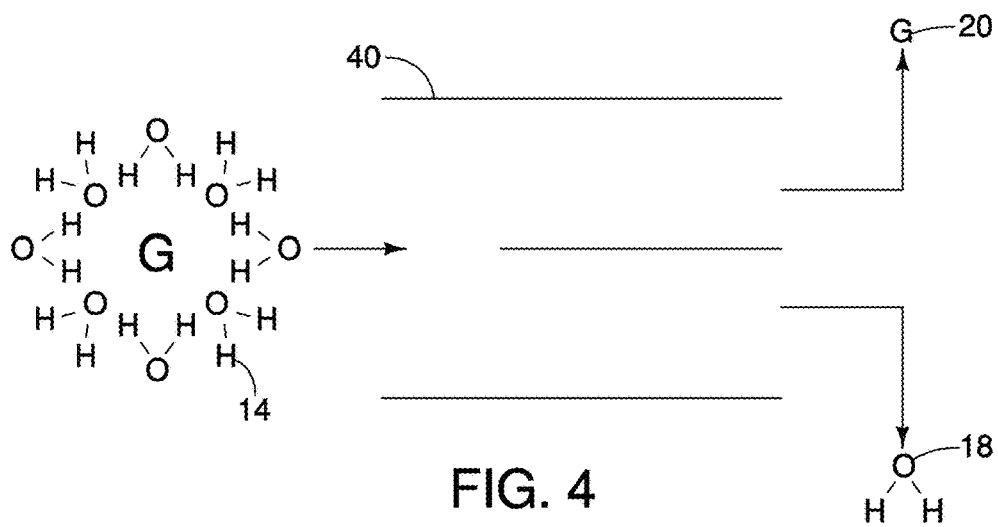
FIG. 4 is a depiction of yet another assembly used for purifying water according to an embodiment of the disclosure.

In accordance with example implementations, an additional assembly of a system used to purify water is provided with representation of FIG. 4, wherein the solid hydrate is dissociated in dissociation assembly 40 to form purified water 18 and liquid refrigerant guest compound 20. The guest compound can be liquid refrigerant upon dissociation. This dissociation can be performed by heating the solid hydrate to a liquid form thus dissociating the hydrate to guest compound and water streams.

In accordance with example implementations, the present disclosure can utilize a guest compound such as an ultra-strong hydrate former, i.e. R134a or other fluorocarbon refrigerant that forms gas hydrate at low pressures 3 to 5 bar (<100 psig). Atomization can be performed with large volume injection of immiscible fluids to produce tiny gas hydrate crystals when injected into cooled refrigerant to separate gas hydrate crystals from concentrate and refrigerant.

Figure 5:
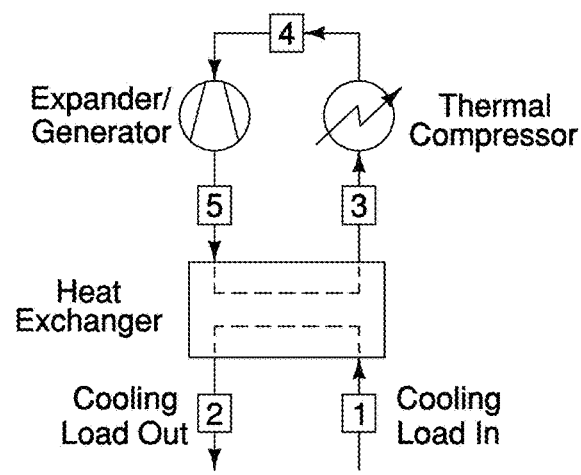
FIG. 5 is a depiction of an assembly for use in a system for purifying water and generating power according to an embodiment of the disclosure.

Referring next to FIG. 5, in accordance with example implementations and with reference to the following embodiments as well as configurations of the systems including assemblies described herein, a guest compound flow diagram is provided that includes a heat exchanger that is arranged between a subassembly of a thermal compressor and an expander/generator 3, 4, and 5; as well as the guest compound stream 1 and 2 entering a hydrate formation chamber assembly, for example. In accordance with example implementations, the guest compound stream can be cooled using the expansion of guest compound returned after dissociation. Power in the form of electricity can be produced by coupling a generator to the expander.

Figure 6:
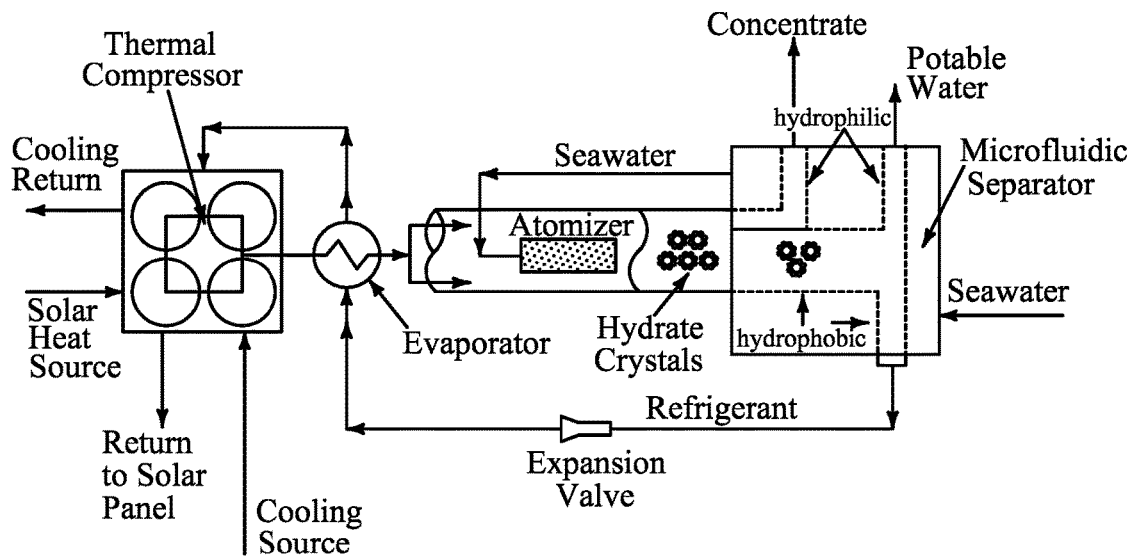
FIG. 6 is an example system for purifying water according to an embodiment of the disclosure.

Referring next to FIG. 6, a system in depicted in accordance with at least one example embodiment of the present disclosure. This system expands on the use of gas hydrates, also called clathrate hydrates to purify water. As referenced above, these clathrate hydrate materials can be ice-like crystalline "inclusion" compounds that form when water (the host compound) is contacted with small hydrophobic molecules (the guest compound) under certain pressure and temperature conditions. When the guest molecule is a constituent of natural gas, clathrate hydrates are also referred to as gas hydrates.

These gas hydrates are formed by cooling the saline water feed. This requires ⅕th the energy as compared with heating to evaporate water as prior art thermal desalination. Impurities are excluded when forming gas hydrates so that when the solids are dissociated or melted, potable water can be generated. No sensitive membranes are used that are susceptible to biofouling or need to maintain positive fluid flow during shutdowns as is required with reverse osmosis systems. The system can be run continuously, it is scalable, and a low cost process to desalinate seawater and higher salinity produced waters.

When coupled with a reactor system that would allow for the exploitation of the salt exclusion properties of gas hydrates when formed in saline water, such a system can be configured to couple with a thermal vapor-compression cooling technology and droplet atomizer technology as well as a solar technology to form a continuous solar powered desalination system. A microfluidic separator can be utilized that incorporates branched hydrophilic and hydrophobic channels to provide separation of the three phase (gas hydrate (14), brine concentrate (16), and guest compound (20)) input to the separator. Energy balance calculations show that this system would require <15 kWh$_{th}$/m$^3$. With a levelized cost of heat (LCOH) of approximately $0.01 per $kWh_{th}$, amortized capital and operating cost estimates show this system achieving a levelized cost of water (LCOW) LCOW≤$0.50/m³.

In accordance with at least one embodiment of the present disclosure, the system can perform a process where water-based gas hydrates form around a R134a core (or other refrigerant), separation, then dissociation of the hydrate to afford pure water (18). The system can include a separator 30 that can define hydrophobic and hydrophilic regions. Gas hydrate 14 can be formed with a brine concentrate 16 as a mixture 12. Mixture 12 can include the solid hydrate complex 14 and the concentrated contaminant mixture 16. The mixture 16 is hydrophilic while the hydrate complex 14 and guest compound is hydrophobic. Leveraging these different chemical properties, the system can separate the complex from the mixture 16 and return, for example, the brine concentrate to seawater, leaving only gas hydrate.

Decomposition of the hydrate will generate water and the guest compound (e.g., R134a). Further hydrophilic/hydrophobic separation will provide pure water and R134a which can be re-used. In accordance with example implementations, this can be performed using micro-channels or microfluidic separators.

One of the significant advantages of a gas hydrate desalination process over conventional multi-effect distillation or vapor-compression methods is the far reduced (theoretical) energy requirement. Desalination processes that involve vaporization of water require both sensible heat inputs to raise the water temperature and approximately 2400 kJ/kg of latent heat input. In contrast, the heat of formation for gas hydrates is typically between 300 to 400 kJ/kg and by choosing a strong hydrate former, may only require cooling the source fluid down to 15° C. Hence, a gas hydrate desalination process would require as little as ⅕th the intrinsic energy input as compared with vaporization-based desalination. That is a very significant advantage for a solar-thermal desalination process.

Commercial processes have typically not been developed around gas hydrate desalination for several reasons. First, the cooling requirement for these systems has been analyzed assuming a typical electric powered mechanical vapor compression system, which provides little or no advantage compared with the electric power requirements for RO. Second, hydrate formation has been envisioned to occur in scaled-up pressure vessels similar to how researchers produce hydrates in the laboratory. Difficulties with that approach include need for large and costly pressure vessels, inefficient mechanical separation of the hydrate crystals from the concentrated brine solution, entrapped salt solution in hydrate crystal agglomerates, and surface fouling and sticking. None of those issues has yet been solved effectively with conventional engineered systems.

Figure 7:
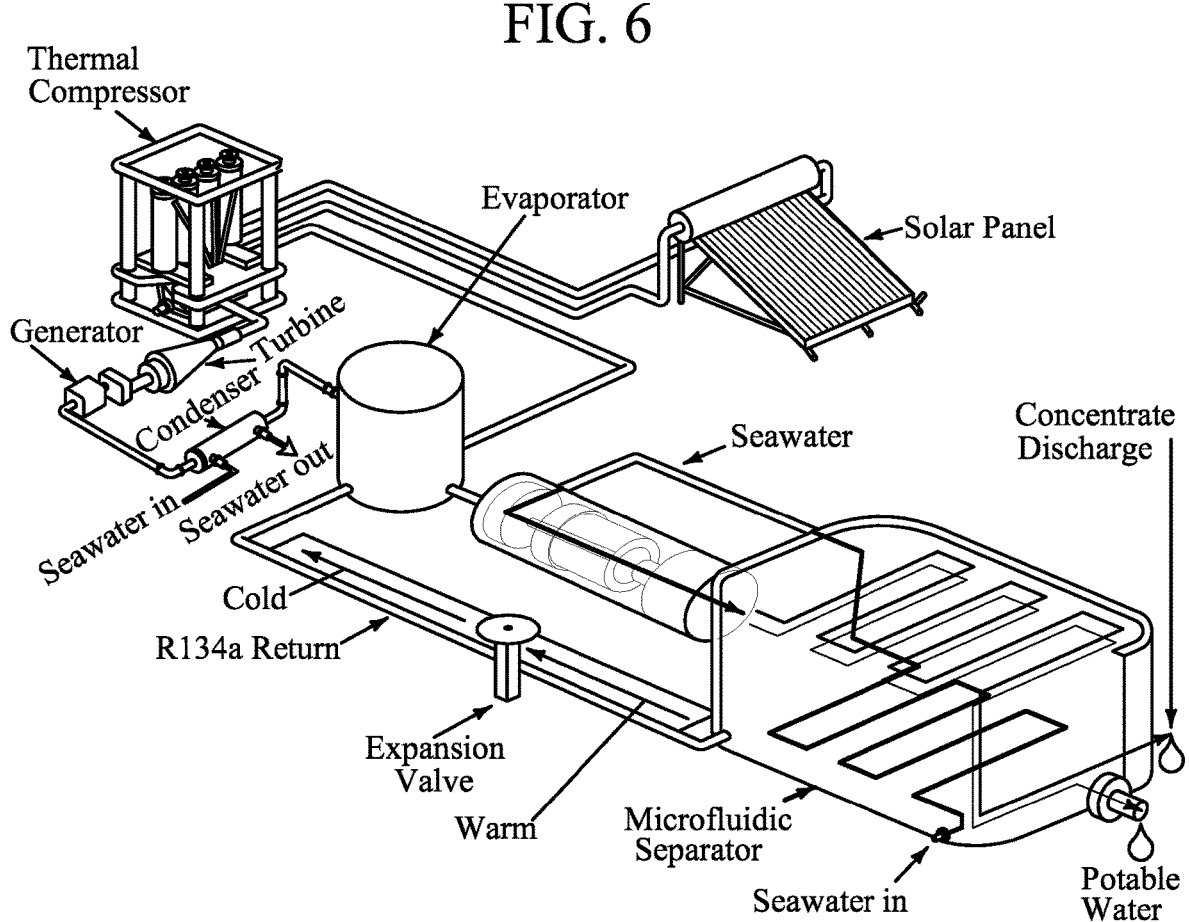
FIG. 7 depicts another example system for purifying water according to an embodiment of the disclosure.

Referring to FIGS. 6 and 7, the separation process can begin by having the three phase fluid enter a channel with opposing hydrophilic and hydrophobic surfaces. The strong opposing surface tension forces split the aqueous concentrate phase (16) from the hydrate-refrigerant phase (14). Aqueous concentrate (16) can be discharged from the hydrophilic channel. The hydrate-refrigerant phase (14) can then be passed over a microchannel heat exchange section to absorb heat from the incoming seawater and dissociate (degenerate) the hydrate crystals to liquid water. The two phase water-refrigerant fluid can then be passed through a second T or Y junction with opposing hydrophilic and hydrophobic surfaces to separate the potable water for discharge and the refrigerant phase for recycle. Discharged refrigerant is cooled through a standard expansion valve before entering the evaporator where the remaining liquid refrigerant is expanded to cool the liquid refrigerant exiting the thermal compressor. Refrigerant vapor is then returned to the thermal compressor to close the cycle.

The system can use sorbent materials that have superfluorophilic properties, i.e. very high sorption capacity and chemical affinity for fluorocarbon refrigerants like R134a. Those properties are exploited in a multibed heat exchanger configuration that very efficiently utilizes low grade heat (90 to 150° C.) to provide a compression effect. This thermal compressor can be a drop-in replacement for the electric-powered compressor in a typical chiller system.

Such a system can provide for the direct conversion solar heat into a cool, pressurized refrigerant stream (such as R134a) that can be used to directly form gas hydrates at modest temperature and pressures of about 10° C. and 4 bar. The atomizer of the system can be used to overcome kinetic barriers that inhibit hydrate formation in batch systems. For example, atomized seawater droplets exiting the atomizer into liquid R134a were found to nearly instantaneously form gas hydrate thus generating a three phase system (microhydrate crystals, aqueous concentrate, and refrigerant).

To effectively separate the three phase gas hydrate bearing fluid, a microfluidic separator such as a "chip" made of a polymer or glass using photolithography methods can be used to etch microchannels where chemical reactions, or in this system separations of fluids can be performed. A unique feature introduced here is use of a mixture of hydrophilic and hydrophobic channels that effectively split and direct flow of the immiscible aqueous and non-aqueous phases in microchannels.

The microfluidic separator is a technical solution to the most challenging aspect of conducting desalination with a gas hydrate process—the phase separation. Moreover, once a flow path design has been proven, the chips can be mass produced at very low cost (<$5 per plate) so that desalination systems can be manufactured to support a broad range of needs from residential to full-scale municipal water systems. There is also no inherent restriction on use of seawater for feed. Higher salinity fluids can also be desalinated with this system by decreasing the evaporator temperature and/or increasing the operating pressure.

Chips can be made of naturally hydrophilic materials (such as silica) and patterned with a series of Y or T junctions with opposing hydrophobic channels. The hydrophobic channels may be produced by coating the channel surfaces with a monolayer of a photocleavable nitrobenzyl based fluorosilane that will very strongly attract fluorocarbon refrigerant. Embodiments of the system can utilize low global warming potential (GWP) alternative refrigerants as guest compounds such a R32, R1234yf, and R1233zde where gas hydrate formation data is limited or has not yet been reported.

In accordance with another embodiment of the disclosure a turboexpander or other type of gas expansion engine (i.e. scroll, or piston expander) is included that can allow the system to generate power. An example calculation estimate of the R134a flow rate (17.6 kg/s) to estimate power output from the system, assuming the thermal compressor produces R134a at 39 bar and 110° C. and the discharge from the expander is at 8 bar and 35° C. This gives a nearly isentropic expansion and would generate between 200 and 400 kW of electric power depending on the parasitic loads in the system. Those loads are difficult to refine at this point due to unknown losses with the atomizer and in the microfluidic separator. However, even at the low end of power production, the impact is very large. Assuming power sales at just $0.07/kWh, this cuts the levelized cost of water generated in half from the same system without power generation.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A system for removing one or more contaminants from water, the system comprising:

a hydrate formation chamber assembly:

a contaminated water diffusion assembly within the hydrate formation chamber assembly, the contaminated water diffusion assembly configured to aerosolize the contaminated water to form aerosolized contaminated water;

a space between a wall of the hydrate formation chamber assembly and the diffusion assembly; and a guest compound conduit configured to provide a guest compound to within the space and form a hydrate comprising water and the guest compound from the aerosolized contaminated water provided from the contaminated water diffusion assembly.

2. The system of claim 1 further comprising a single exit conduit configured to provide a mixture of solid hydrate and liquid contaminate concentrate.

3. The system of claim 2 further comprising a separation assembly operably coupled to the single exit and configured to receive the mixture of solid hydrate and liquid contaminate concentrate.

4. The system of claim 3 further comprising at least two separation assembly exit conduits, one of the conduits configured to convey solid hydrate and another of the two conduits configured to convey liquid contaminate concentrate.

5. The system of claim 4 further comprising a hydrate dissociation assembly operably coupled to the one conduit and configured to receive and dissociate the solid hydrate to water and the guest compound.

6. The system of claim 5 further comprising a compressor configured to receive the guest compound and provide the guest compound to the guest compound conduit.

7. The system of claim 2 further comprising a microfluidic separator configured to separate the hydrate from the contaminate concentrate.

8. The system of claim 2 further comprising a microfluidic separator configured to dissociate the hydrate.

9. The system of claim 8 wherein the guest compound of the hydrate comprises methane, ethane, fluorocarbons, R134a, hydrofluorocarbons, carbon dioxide, and/or $H_2S$.

10. The system of claim 9 wherein the microfluidic separator comprises a hydrophobic pathway and a hydrophilic pathway, wherein the hydrate having methane, ethane, fluorocarbons, R134a, hydrofluorocarbons, carbon dioxide, and/or $H_2S$ proceeds via the hydrophobic pathway, and the contaminate proceeds via the hydrophilic pathway.

11. The system of claim 2 further comprising a microfluidic separator configured to separate water from the guest compound.

12. The system of claim 1 further comprising an evaporator operably aligned with the guest compound conduit to facilitate a temperature change of the guest compound prior to entering the hydrate formation chamber.

* * * * *